United States Patent
Oguma et al.

(10) Patent No.: US 9,331,854 B2
(45) Date of Patent: May 3, 2016

(54) MESSAGE AUTHENTICATION METHOD IN COMMUNICATION SYSTEM AND COMMUNICATION SYSTEM

(71) Applicants: TOYOTA JIDOSHA KABUSHIKI KAISHA, Toyota-shi (JP); National University Corporation YOKOHAMA National University, Yokohama-shi (JP)

(72) Inventors: Hisashi Oguma, Minato-ku (JP); Tsutomu Matsumoto, Yokohama (JP); Masato Hata, Yokohama (JP); Masato Tanabe, Yokohama (JP); Katsunari Yoshioka, Yokohama (JP); Kazuomi Oishi, Yokohama (JP)

(73) Assignees: TOYOTA JIDOSHA KABUSHIKI KAISHA, Toyota-Shi (JP); NATIONAL UNIVERSITY CORPORATION YOKOHAMA NATIONAL UNIVERSITY, Yokohama-Shi (JP)

( * ) Notice: Subject to any disclaimer, the term of this patent is extended or adjusted under 35 U.S.C. 154(b) by 0 days.

(21) Appl. No.: 14/355,038

(22) PCT Filed: Oct. 30, 2012

(86) PCT No.: PCT/JP2012/078049
§ 371 (c)(1),
(2) Date: Apr. 29, 2014

(87) PCT Pub. No.: WO2013/065689
PCT Pub. Date: May 10, 2013

(65) Prior Publication Data
US 2014/0310530 A1     Oct. 16, 2014

(30) Foreign Application Priority Data
Oct. 31, 2011    (JP) .................................. 2011-239161

(51) Int. Cl.
*H04L 9/32*       (2006.01)
*H04L 9/12*       (2006.01)

(52) U.S. Cl.
CPC ................ *H04L 9/32* (2013.01); *H04L 9/3242* (2013.01); *H04L 9/12* (2013.01); *H04L 2209/84* (2013.01)

(58) Field of Classification Search
None
See application file for complete search history.

(56) References Cited

U.S. PATENT DOCUMENTS 5,673,318 A     9/1997   Bellare et al.
(Continued)

FOREIGN PATENT DOCUMENTS

JP          200981564 A       4/2009
WO      2009/124803 A1     10/2009

OTHER PUBLICATIONS

D. Davies et al., "Network Security," Nikkei Magurouhiru-Sha, Dec. 5, 1985, pp. 126-129, (accompanied by translated IPRP as concise explanation).

(Continued)

*Primary Examiner* — Michael R Vaughan
(74) *Attorney, Agent, or Firm* — Kenyon & Kenyon LLP

(57) ABSTRACT

Each of ECUs counts the number of messages transmitted for each of CAN IDs. A transmission node that has transmitted a main message produces an MAC from a data field and the CAN ID in the main message and a counter value corresponding to the CAN ID, and transmits the MAC as an MAC message. A reception node that has received the main message produces an MAC from the data field and the CAN ID contained in the main message and the counter value corresponding to the CAN ID, and determines whether the MAC matches the MAC contained in the MAC message. By so doing, verification whether the main message is valid or not can be made. According to this configuration, message authentication by the MAC can be made without changing a CAN protocol.

14 Claims, 10 Drawing Sheets

(56) References Cited

U.S. PATENT DOCUMENTS

| | | | |
|---|---|---|---|
| 2002/0082921 A1* | 6/2002 | Rankin | 705/14 |
| 2006/0215581 A1* | 9/2006 | Castagnoli | 370/254 |
| 2007/0104199 A1* | 5/2007 | Taha | 370/392 |
| 2007/0245147 A1 | 10/2007 | Okeya | |
| 2008/0098218 A1* | 4/2008 | Sibigtroth et al. | 713/168 |
| 2010/0111308 A1* | 5/2010 | Forsberg et al. | 380/278 |
| 2010/0177737 A1* | 7/2010 | Song et al. | 370/331 |
| 2010/0208886 A1* | 8/2010 | Boehl | H04L 9/0637 380/28 |
| 2012/0313796 A1* | 12/2012 | Lee | B60R 25/2018 340/989 |

OTHER PUBLICATIONS

A. Yoshioka et al., "Kosei Shomei Kino o Motsu Shanai Tsushin Protocol no Teian," ("New Attestation Based Security Protocol for In-Vehicle Communication"), Symposium on Multimedia, Distributed, Cooperative, and Mobile Systems, Ronbunshu [CD-ROM], Jul. 2, 2008, vol. 2008, No. 1, pp. 1270-1275, (please see Oguma 2008 (NPL Reference No. 3) as English translation).

H. Oguma et al., "New Attestation-Based Security Architecture for In-Vehicle Communication," IEEE "Globecom" Global Telecommunications Conference, 2008.

D. Nilsson et al., "Efficient In-Vehicle Delayed Data Authentication Based on Compound Message Authentication Codes," IEEE 68th Vehicular Technology Conference, 2008, pp. 1-5.

* cited by examiner (A) COUNTER MEASUREMENT PROCESSING (B) MAC CALCULATION PROCESSING

FUNCTIONS USED WHEN TRANSMITTING MESSAGE

FUNCTIONS USED WHEN RECEIVING MESSAGE

FUNCTIONS USED WHEN RECEIVING
COUNTER VALUE INITIALIZATION MESSAGE

MESSAGE AUTHENTICATION METHOD IN COMMUNICATION SYSTEM AND COMMUNICATION SYSTEM

CROSS-REFERENCE TO RELATED APPLICATIONS

This is a national phase application based on the PCT International Patent Application No. PCT/JP2012/078049 filed on Oct. 30, 2012, claiming priority to Japanese application No. 2011-239161 filed Oct. 31, 2011, the entire contents of both of which are incorporated herein by reference.

TECHNICAL FIELD

The present invention relates to a message authentication technique in a communication system.

BACKGROUND ART

CAN (Controller Area Network) has been employed as an in-vehicle network. Provided in CAN is a diagnostic port called an OBD2 port, which can receive a message flowing on a network and transmit a message onto the network.

As the OBD2 port is an interface for direct connection that does not perform filtering processing of the message and the like, there is the risk of a replay attack when a malicious device is connected to the OBD2 port. The replay attack here means the attack of intercepting the message flowing on the network, storing its contents, and resending the stored message, so as to cause invalid operation. It should be noted that, even though the malicious device does not know the contents of the message, it can figure out the intent of the message when vehicle behavior after the transmission of the message is known to the device.

As a technique to prevent such a replay attack, the technique of embedding a message authentication code (MAC) in a CAN message has been proposed (Non-Patent Document 1). According to this proposal, from data fields (64×4=256 bits) contained in four CAN messages, that is, from N-th to N+3rd CAN messages, the MAC of 64 bits is produces as illustrated in FIG. 11. This MAC is divided in four pieces each having 16 bits, which are embedded in CRC fields (16 bits) of four CAN messages, that is, from N+4th to N+7th CAN messages, and transmitted.

A reception side acquires the MAC from the CRC fields of the N+4th to N+7th CAN messages, and determines whether the N-th to N+3rd CAN messages are valid or not according to whether the MAC matches the MAC produced from the N-th to N+3rd data fields. When the MAC obtained from the CRC fields is different from the MAC calculated from the data fields, it is possible to determine that either one of the N-th to N+3rd CAN messages is invalid.

Non-Patent Document 1: D. K. Nilsson, U. E. Larson, E. Jonsson, "Efficient In-Vehicle Delayed Data Authentication Based on Compound Message Authentication Codes", IEEE 68th VTC 2008-Fall, 2008, 1-5

SUMMARY OF INVENTION

Technical Problem

However, the method as disclosed in the Non-Patent Document 1 has the following problems. The first problem is that, as the messages to the N+7th message need to be received in order to verify the validity of the N-th message, the verification of the message requires time.

The second problem is that the standardized CAN protocol is changed according to the method as disclosed in the Non-Patent Document 1. The CRC field is originally for detecting an error in data contents in the data field or the like. Considering the current situation where processing of a CAN controller is realized by hardware, changing the protocol is not realistic. Thus, this second problem is of greater seriousness.

It is an object of the present invention to provide the technique that enables the authentication of the message by using the method applicable to the CAN protocol.

Solution to Problem

According to a message authentication method of the present invention, a main message and an MAC message containing a message authentication code (MAC) of the main message are transmitted. A reception side can determine that the main message is valid when the MAC calculated from the main message matches the MAC contained in the MAC message, and that the main message is invalid when the MACs do not match each other. The present invention is characterized in the MAC produced as follows.

Each node in a communication system stores a counter value that is incremented every time a main message is transported on the network. The node that transmits the main message increments the counter value upon transmission. The node other than the transmission node increments the counter value when it detects the transport of the main message on the network. Although an initial value of the counter value may not necessarily be zero and may be freely selected, the initial value needs to be common in the respective nodes. Further, the increment may not be necessarily required to increase the counter value by one. The counter value may be changed according to a freely-selected method every time the main message is transmitted, as long as the counter value is changed in the respective nodes according to the common rule, that is, as long as the counter value is common in all of the nodes.

The transmission node of the main message uses this counter value to produce a MAC to be contained in a MAC message. More specifically, a predetermined algorithm is applied to the main message and the counter value, so as to produce the MAC. This predetermined algorithm may be, for example, an encryption algorithm using a common key encryption, a hash function with a key that needs to pre-share the encryption key, or the like. It should be noted that, upon production of the MAC, all data bits of the main message may not necessarily be used, and only a part thereof and the counter value may be used to produce the MAC.

Similarly, a reception node of the main message applies the predetermined encryption algorithm to the received main message and the counter value, so as to produce the MAC.

According to the present invention like this, the validity of the main message can be verified by the MAC, according to the method applicable to the CAN protocol. Even when the malicious device transmits the MAC message that corresponds to the previously-received main message, for example, the correct MAC has been changed at the time of resending, because the counter value has been changed. Thus, even when the replay attack is made by the malicious device, the reception node can detect that the main message is invalid.

Further, according to the present invention, the malicious device is able to know the main message because the main message is transported on the network in plaintext, but the malicious device does not know the counter value because it is not transported on the network. Therefore, there is such an advantage that, even though the main message and the MAC message are intercepted, the encryption algorithm and the encryption key for producing the MAC cannot be presumed from these.

According to the present invention, the main message may include the message ID and the data field. In this case, it is preferable that the counter value of the main message is counted independently for each message ID. Further, it is preferable that the MAC is produced based on the message ID and the data field contained in the main message and the counter value corresponding to the message ID. In such a case, it is also possible to produce the MAC from the data field and the counter value only.

Further, according to the present invention, it is preferable that the MAC is produced by extracting the predetermined bits from a bit string that is produced by applying a common key encryption algorithm to the message ID, the data field, and the counter corresponding to the message ID. This method is effective when the bit number of the bit string, obtained by the common key encryption algorithm, is more than the bit number that can be contained in the MAC message. Incidentally, the method of extracting the bits may be the freely-selected method, as long as the method is common in the respective nodes. For example, a bit string in the first half or a bit string in the latter half may be extracted, or an odd-numbered bit string or an even-numbered bit string may be extracted from the bit string that is obtained by the common key encryption algorithm.

Furthermore, according to the present invention, it is preferable that initialization of the counter value is made by notification from a master node. Namely, it is preferable that one node on the network serves as the master node, and notifies by broadcasting an initial value of the counter value corresponding to each message ID at the time of starting the communication system.

Thereby, the counter value can be made identical in all of the nodes, even though each of the nodes does not have nonvolatile memory.

More specifically, the initialization of the counter value is preferably made as follows. Namely, the master node produces a random number value for each message ID, and transmits the random number value by broadcasting. Each of the nodes acquires the random number value that is transmitted by broadcasting, and applies the common key encryption algorithm to the random number value. Thus-obtained value is employed as the initial value of the counter value.

Thereby, the initial value of the counter value does not directly flow on the network, and therefore, the value by which the counter value is initialized is not known to the malicious device. When the initial value is known, it is possible to know the counter value at an arbitrary point of time, and to decipher the encryption key from the main message and the MAC message. However, such a danger can be avoided by concealing the counter initial value.

It should be noted that the present invention can be interpreted as a message authentication method containing at least a part of the above-described processing. Further, the present invention can be interpreted as a computer program for executing this method. Furthermore, the present invention can be interpreted as a communication system that executes at least a part of the above-described processing, and a communication device constituting the communication system. The respective kinds of means and processing as described above may be combined as much as possible to form the present invention.

Advantageous Effects of Invention

According to the present invention, the authentication of the message according to the method applicable to the CAN protocol can be made possible.

BEST MODE FOR CARRYING OUT THE INVENTION

Before the explanation about an embodiment, the outline of CAN (Controller Area Network) protocol will be explained. CAN is a communication protocol used for transporting data between devices that are connected to each other, and is used for communication between various ECUs (Electronic Control Units) in an automobile, for example.

Figure 1:
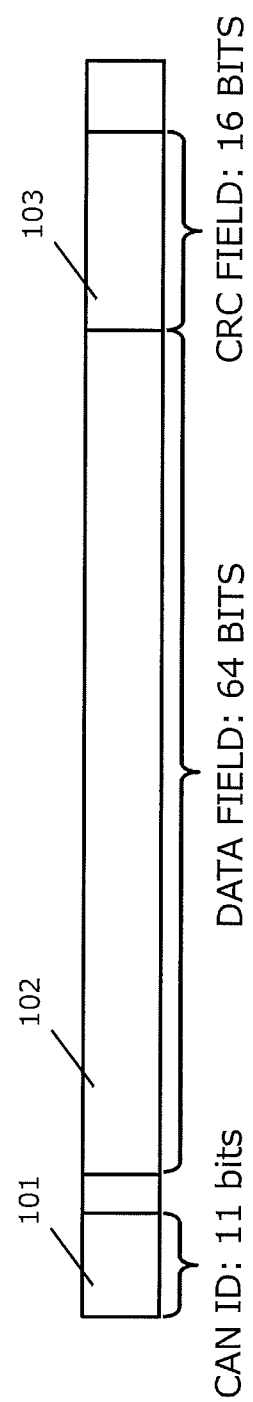
FIG. 1 is a view illustrating a format of a data frame in CAN protocol.

FIG. 1 is a view illustrating a format of a data frame used for CAN. The data frame includes a CAN ID (101), a data field (102), a CRC field (103), and the like. The explanations about not-illustrated fields will be omitted. According to the CAN, a message is addressed by using the CAN ID. Namely, the CAN ID indicates what kind of data is in the message, and the CAN ID is referred to by a reception side upon determining whether the data needs to be processed by the reception node or not. The data field is the field of 64 bits (at the maximum), and contains data contents therein. The CRC field contains a CRC code that is calculated from the data field or the like, which makes it possible to detect bit dropout accompanying the communication.

According to CAN, as described thus far, an ID indicating a transmission source or destination is not given to the message, and instructions on the data contents and a reception node are given by the CAN ID.

According to this embodiment, the present invention is applied to a CAN network, and validity verification of the message is made. Hereinafter, the embodiment will be explained with reference to the drawings.

(Outline)

Figure 2:
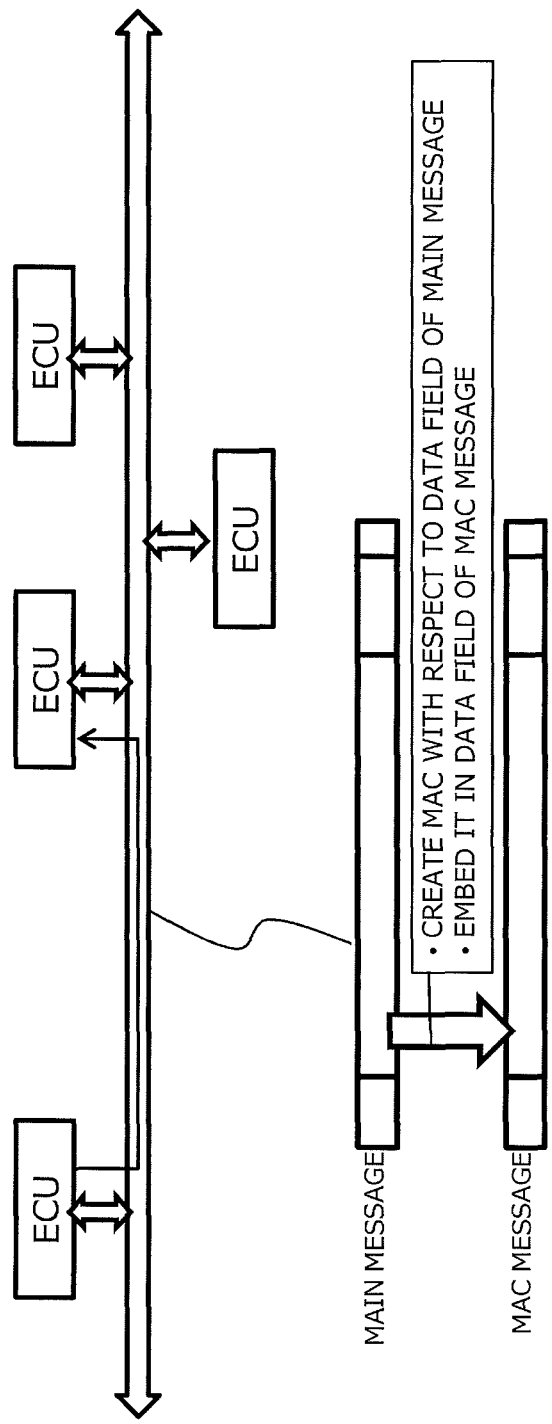
FIG. 2 is a view illustrating the outline of message verification processing according to this embodiment.

FIG. 2 is a view illustrating the outline of the present invention. The data communication between the ECUs that are connected to a network is made as follows. Namely, after a message containing data to be communicated (hereinafter referred to as a main message) is transmitted, a message containing an MAC (message authentication code) with respect to the data field of the main message (hereinafter referred to as an MAC message) is transmitted. Message authentication by the MAC is the known system in itself and, according to this embodiment, the validity of the main message is verified on the reception side according to whether or not the MAC obtained from the data field of the received main message matches the MAC contained in the received MAC message.

Figure 3:
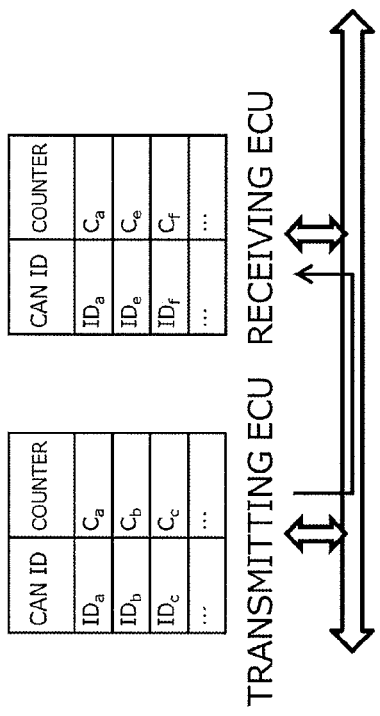
FIGS. 3 are views illustrating the outline of an MAC calculation method according to this embodiment.
Figure 3:
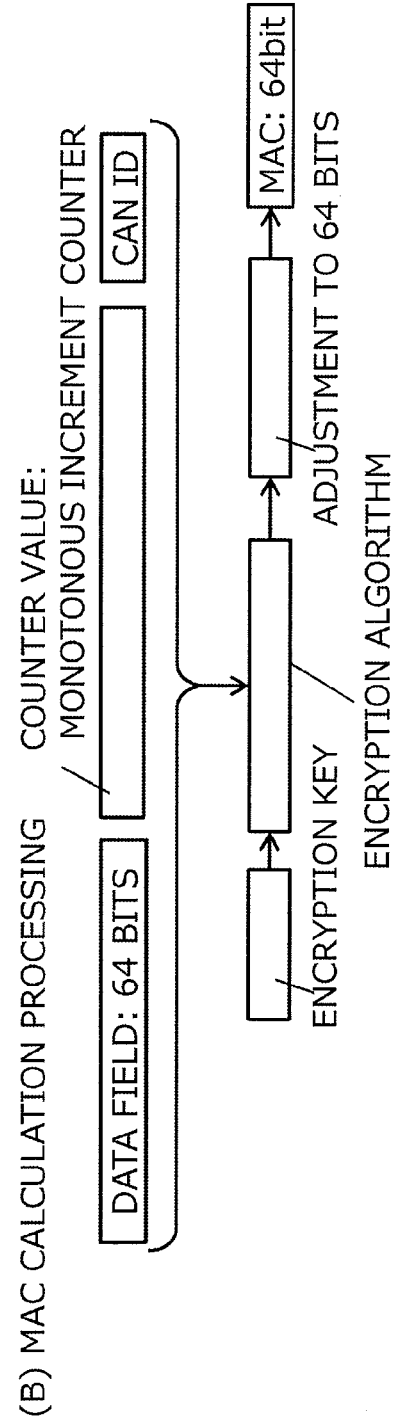

According to this embodiment, as illustrated in FIG. 3(A), each of the ECUs counts and stores the number of the transmitted messages for each of the CAN IDs. It is characterized in that the MAC is obtained by using the data field and the CAN ID of the main message and a counter value corresponding to the CAN ID, as illustrated in FIG. 3(B). The calculation of the MAC may be made by a freely-selected known method such as a method using a hash function (HMAC) or a method of using a block encryption algorithm (CMAC or the like). According to this embodiment, the MAC is obtained by an AES encryption algorithm that is one of common key block encryptions. According to the AES, an output is at least 128 bits, and predetermined 64 bits are extracted from the output of 128 bits, and used as the MAC, because the data field in which the MAC is contained is 64 bits. Incidentally, some common key encryption algorithms are able to output 64 bits, and the above-described extraction operation is not necessary when such a common key encryption algorithm is employed.

According to this embodiment, each of the ECUs counts the message transmission number for the respective CAN IDs, and therefore, the counter values of the respective CAN IDs are common in all the ECUs. Therefore, the ECU on the reception side can also obtain the MAC from the data field and the CAN ID that are contained in the main message and the counter value that is stored in the node. Then, the validity of the main message can be verified according to whether or not thus-obtained MAC matches the MAC contained in the MAC message.

In briefly explaining the effects of this embodiment, the first effect is that, as the CAN protocol is not changed, it is compatible with existing systems. For example, it is possible to use a CAN controller that is made into hardware for the purpose of high speed processing and cost reduction. The second effect is that, as the counter value is updated every time of the message is transmitted, the verification of an invalid message is possible on the reception side, even though a malicious device transmits the previously-received message as it is. The third effect is that, as the counter value does not flow on a network, an attempt to receive the main message and the MAC message and to decipher an encryption key is virtually impossible. The fourth effect is that, as the MAC message corresponding to the main message can be transmitted immediately after the main message is transmitted, the validity of the main message can be verified instantly.

(Structure)

Figure 4:
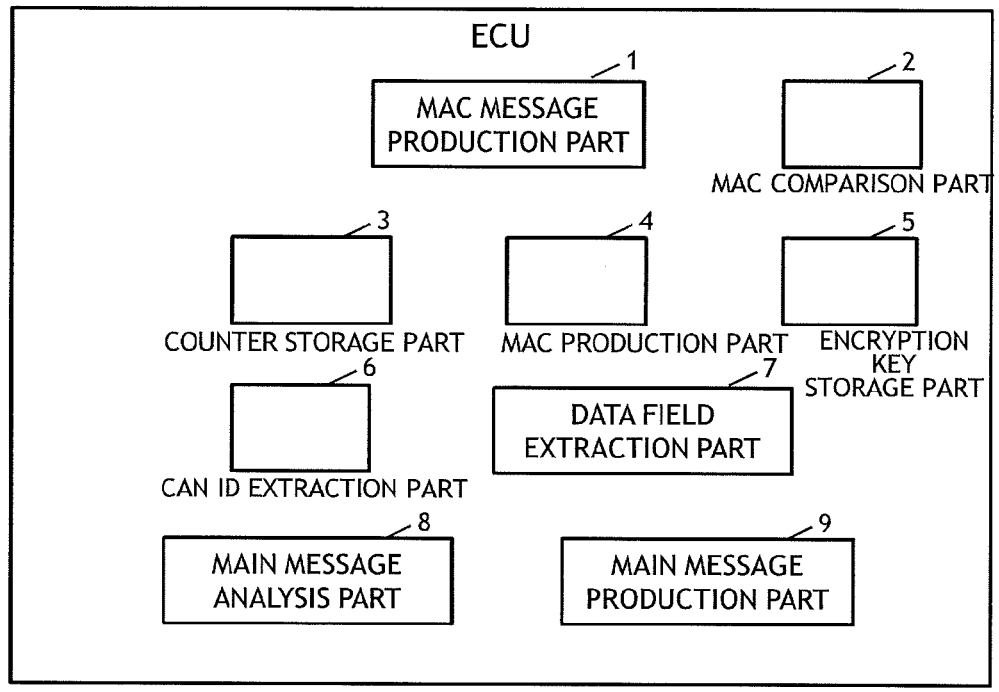
FIG. 4 is a view illustrating functional structure of an ECU according to this embodiment.

Hereinafter, this embodiment will be explained in more detail. FIG. 4 is a view illustrating function parts that the ECU according to this embodiment has. The ECU is formed by a CPU, RAM, ROM, interfaces to a sensor and an actuator, and the like. When the CPU executes programs contained in the ROM, the various function parts illustrated in FIG. 4 are realized. In FIG. 4, all the function parts that are required for transmitting and receiving the messages are illustrated, and the appropriate function parts are selectively executed according to the contents of the processing.

Incidentally, according to this embodiment, the message authentication by the MAC may not necessarily be made for all of the messages. Namely, the message authentication may be made for the important message only. When the ECU transmits and receives only the messages that do not require the message authentication, the respective function parts for the message authentication, as illustrated in FIG. 4, are not necessary.

The details of the respective function parts as illustrated in FIG. 4 will be explained together with message transmission/reception processing, but some of the function parts will be explained here.

An encryption key storage part 5 stores an encryption key (common key) that is common in the CAN network. It is required that the encryption key does not leak to the outside. According to this embodiment, it is supposed that the AES encryption algorithm is employed and a key length is 128 bits. It goes without saying that the key length might be longer, and the encryption algorithm other than the AES might be employed.

A counter storage part 3 contains a counter value indicating the number of times when the message is transported on the network, for each of the CAN IDs. As the CAN has a bus-type architecture, all the ECUs are able to refer to the message that is transported on the network, and all the ECUs are able to update their counters. Incidentally, it would be enough for each of the ECUs to update and store the counter for the CAN ID that may be transmitted and received by each of the nodes.

It should be noted that the counter is 53 bits according to this embodiment. This is because, as an input to an encryption algorithm requires 128 bits, the data field (64 bits) and the CAN ID (11 bits) are added to make 128 bits. However, there is no problem if the bit number of the counter is smaller than the above, as the input to the encryption algorithm may be padded. Even when the messages are transmitted continuously for 20 years at the maximum speed according to CAN specifications, for example, the number of the messages to be transmitted is no more than $2^{40}$, and therefore, the counter value may be about 40 bits. Needless to say, repetition of the counter value may be permitted, and in this case, the bit number may be smaller.

(Message Transmission Processing)

Figure 5:
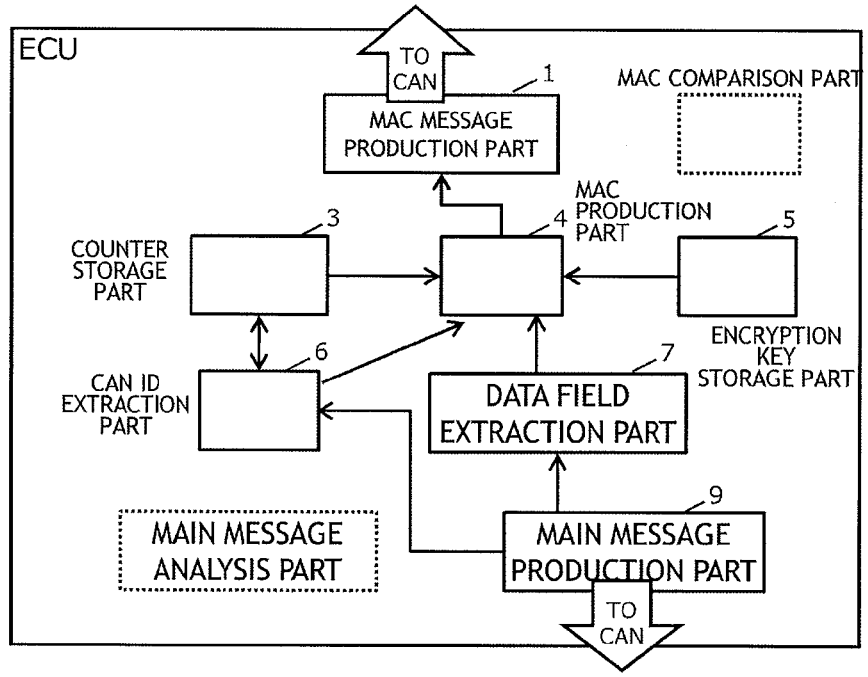
FIG. 5 is a view illustrating cooperation between respective function parts in an ECU transmitting a message.
Figure 6:
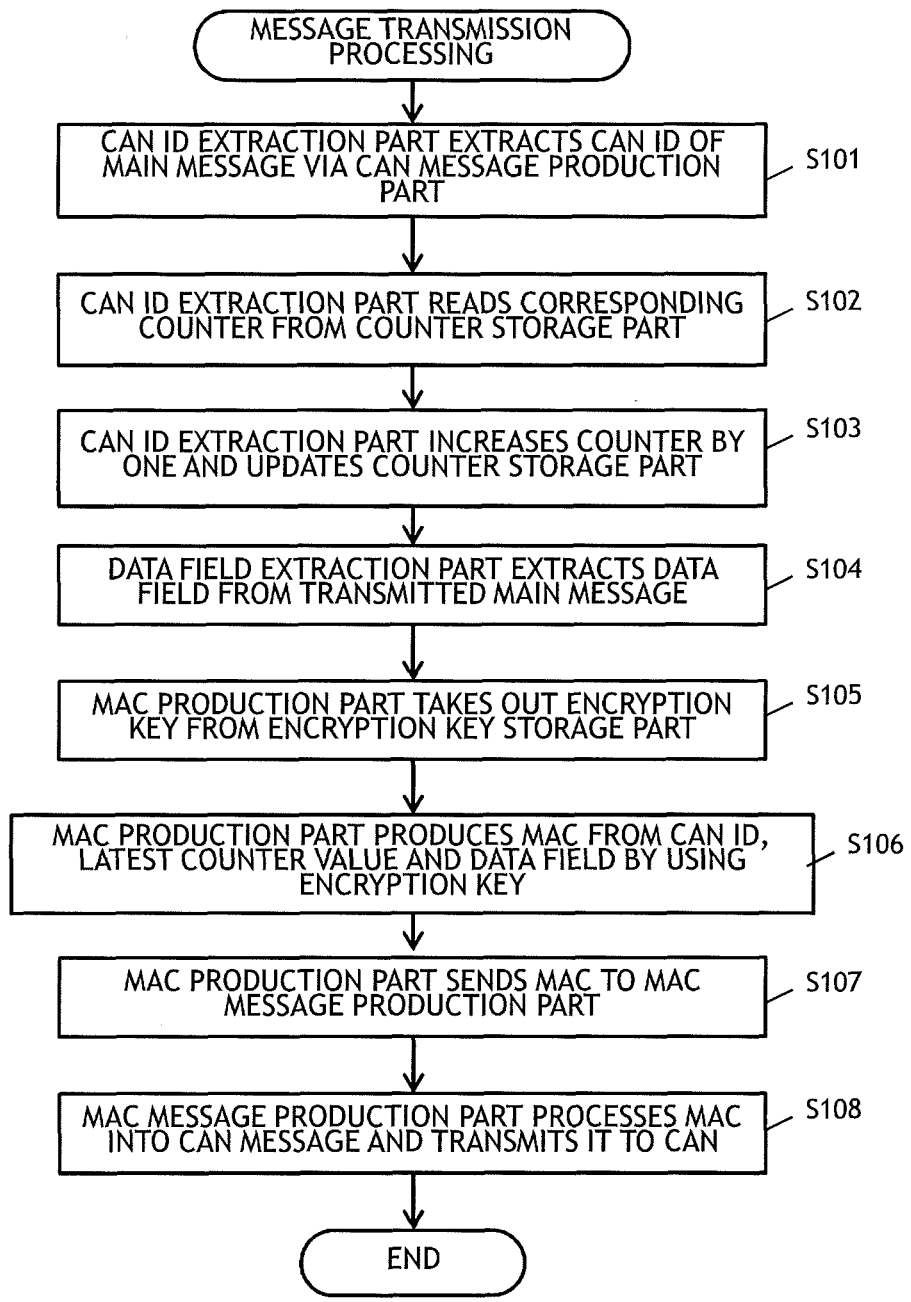
FIG. 6 is a flowchart illustrating a flow of the processing in an ECU transmitting a main message.

First, the processing that is executed by the ECU transmitting the main message will be explained with reference to FIG. 5 and FIG. 6. FIG. 5 is a view illustrating cooperation between the respective function parts in the transmission ECU. FIG. 6 is a flowchart illustrating a flow of the processing at the time of transmitting the main message.

A main message production part 9 produces the main message containing the CAN ID and the data field, and transmits it to the CAN. In the flowchart of FIG. 6, the flow of the processing after the main message is transmitted is illustrated. After the main message is transmitted, a CAN ID extraction part 6 extracts the CAN ID of the main message that is transmitted from the main message production part 9 (S101). The CAN ID extraction part 6 reads the counter value corresponding to the CAN ID of the main message from the counter storage part 3 (S102), increases the counter by one, and updates the counter storage part 3 (S103). The extracted CAN ID and the updated counter value are sent to an MAC production part 4.

In addition, a data field extraction part 7 extracts the data field of the main message that is transmitted from the main message production part 9 (S104). The extracted data field is sent to the MAC production part 4.

The MAC production part 4 takes out the encryption key (common key) from the encryption key storage part 5 (S105), and produces the MAC from the CAN ID, the latest counter value, and the transmitted data field, by using the encryption key (S106). It should be noted that, as described above, the output of the encryption algorithm is 128 bits as the AES is employed according to this embodiment, but the data field that can be transmitted by the data frame of the CAN is 64 bits. Therefore, 64 bits are extracted from the output of 128 bits, according to a rule that is common in the system. For example, 64 bits in the first half or 64 bits in the latter half may be employed, or odd-numbered bits or even-numbered bits may be employed. Further, the employment of the 64 bits in the first half or the 64 bits in the latter half, or the employment of the odd-numbered bits or the even-numbered bits may be decided according to whether the CAN ID is odd-numbered or even-numbered.

The MAC produced by the MAC production part 4 is sent to the MAC message production part 1 (S107), and the MAC message production part 1 processes the MAC into the CAN message (MAC message) and transmits it to the CAN. Namely, the calculated MAC of 64 bits is contained in the data field of the MAC message. Further, the ID corresponding to the CAN ID of the main message is used as the CAN ID of the MAC message. By the correspondence of the CAN IDs between the main message and the MAC message, it is possible for the ECU on the reception side to figure out that the MAC corresponds to the main message having the corresponding CAN ID, upon receiving the MAC message.

(Message Reception Processing)

Figure 7:
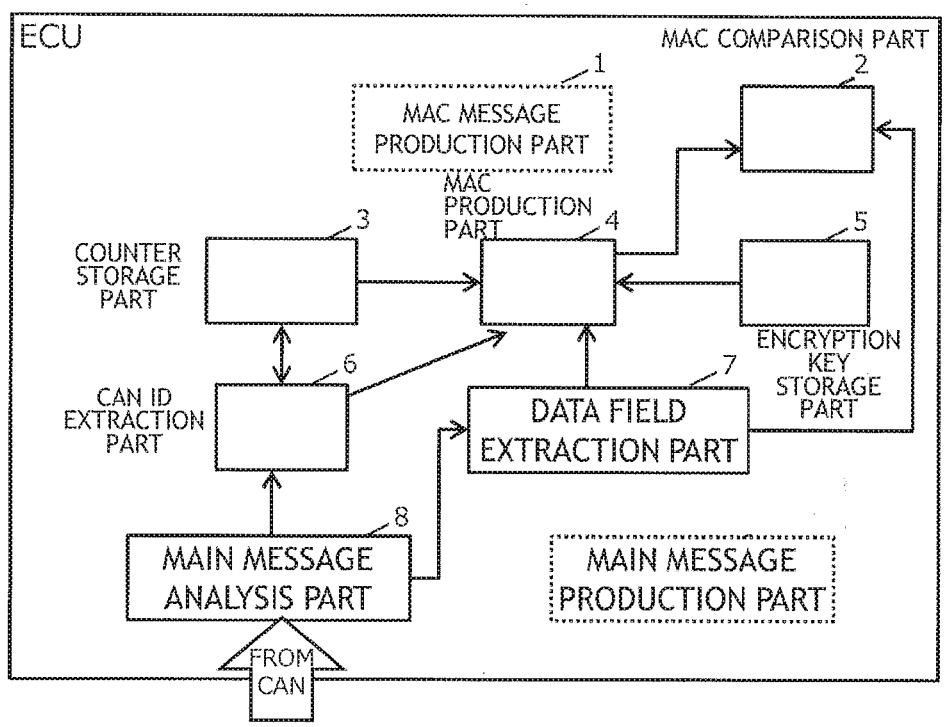
FIG. 7 is a view illustrating cooperation between respective function parts in an ECU receiving the message.
Figure 8:
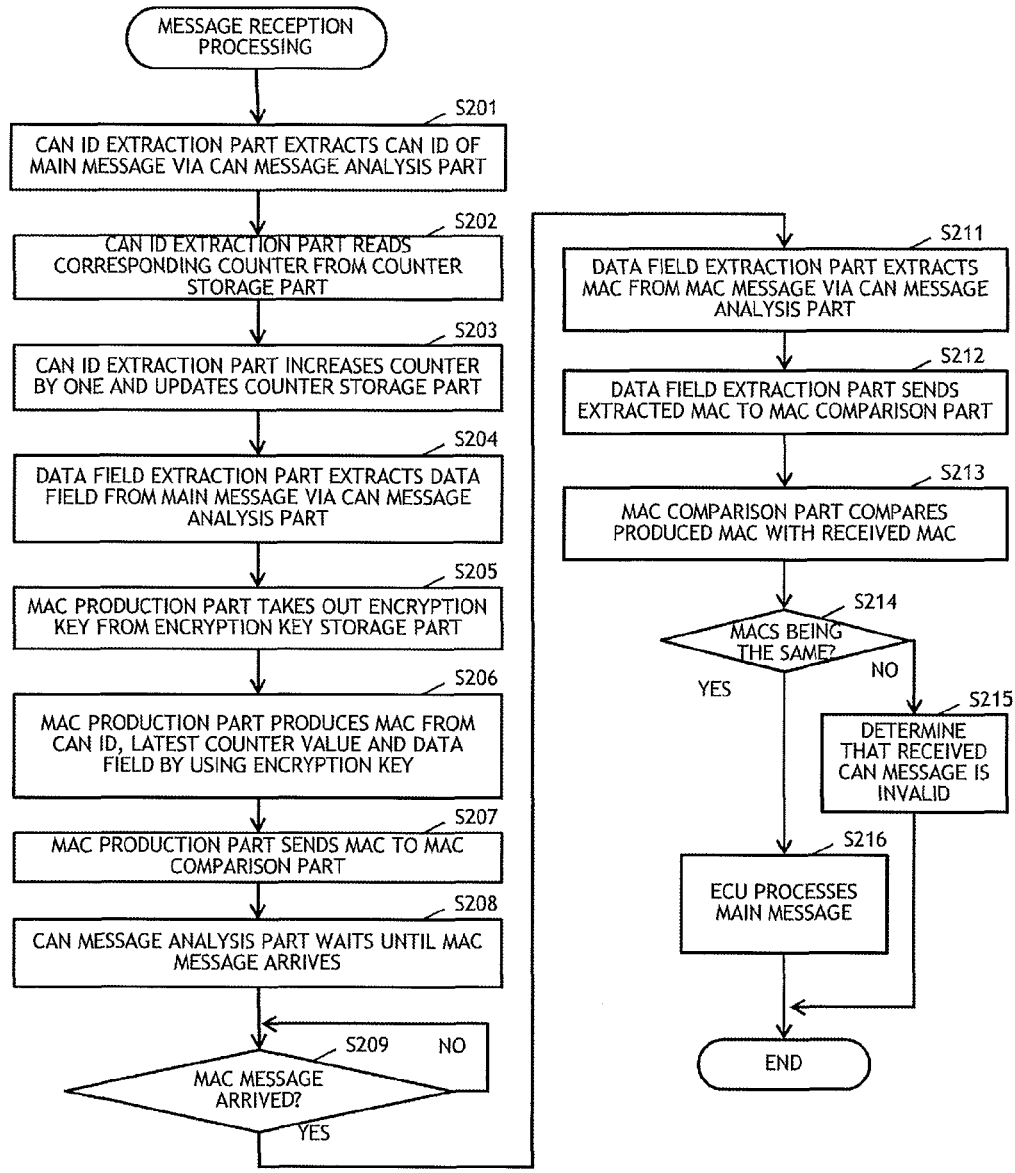
FIG. 8 is a flowchart illustrating a flow of the processing in an ECU receiving the main message.

Next, the processing that is executed by the ECU receiving and verifying the main message will be explained with reference to FIG. 7 and FIG. 8. FIG. 7 is a view illustrating cooperation between the respective function parts in the reception ECU. FIG. 8 is a flowchart illustrating a flow of the processing at the time of receiving the main message.

When the ECU receives the main message, the CAN ID extraction part 6 extracts the CAN ID of the received main message, via a CAN message analysis part 8 (S201). By referring to the CAN ID, it is possible to determine whether the message requires the authentication by the MAC or not, as the contents of the message are defined for each of the CAN IDs. When the received main message does not require the authentication by the MAC, the following processing is not required. In addition, when it is not necessary to process the received message by the node, the following processing is also not required.

When it is determined from the extracted CAN ID that the received main message needs to be processed by the node and that the message authentication by the MAC is required, the following processing is executed. The CAN ID extraction part 6 reads the counter value corresponding to the extracted CAN ID from the counter storage part 3 (S202), increases the counter by one, and updates the counter storage part 3 (S203). The extracted CAN ID and the updated counter value are sent to the MAC production part 4.

In addition, the data field extraction part 7 extracts the data field of the received main message, via the CAN message analysis part 8 (S204). The extracted data field is sent to the MAC production part 4.

The MAC production part 4 takes out the encryption key (common key) from the encryption key storage part 5 (S205), and produces the MAC from the data field and the CAN ID of the received message, and the latest counter value corresponding to the CAN ID, by using the encryption key (S206).

The production method of the MAC is the same as the method for transmitting the message, and therefore, detailed explanations thereof will be omitted. The MAC produced by the MAC production part 4 is sent to an MAC comparison part 2 (S207).

The ECU on the reception side waits until the CAN message analysis part 8 receives the MAC message corresponding to the main message (S208 to S209). As the CAN ID of the main message and the CAN ID of the MAC message correspond to each other, as described above, the CAN message analysis part 8 waits until the message having the CAN ID corresponding to the CAN ID of the main message arrives.

When the MAC message corresponding to the main message arrives (S209-YES), the data field extraction part 7 extracts the MAC from the MAC message, via the CAN message analysis part 8 (S211). As described above, the MAC is contained in the data field (64 bits) of the MAC message. The MAC extracted by the data field extraction part 7 is sent to the MAC comparison part 2 (S212).

The MAC comparison part 2 compares the MAC produced by the MAC production part 4 with the MAC extracted from the received MAC message (S213). When these two MACs are the same (S214-YES), it is found that the main message is valid, and the reception ECU processes the main message (S216). Meanwhile, when these two MACs are different from each other (S214-NO), it is found that the main message is invalid, and the reception ECU does not process the main message (S215). Incidentally, various kinds of processing are possible after receiving the invalid main message, and any kind of action may be taken.

(Counter Initialization Processing)

Next, initialization of the counter value for each of the CAN IDs will be explained. It is necessary that the counter value is common in all the ECUs in the system. While the system is operating, the counters in all the ECUs can be made identical to each other by counting the messages transported on the network, but it is also necessary to make the counter values identical to each other at the time of starting the system. For this reason, it is possible to provide a readable and writable nonvolatile memory in each of all the ECUs, in which the counter values when turning off the power are stored, and to read the counter values out of the nonvolatile memory for use at the time of restarting the system. However, according to this embodiment, the counter values at the time of starting the system are made identical to each other as follows, without providing the nonvolatile memory in each of all the ECUs.

According to this embodiment, a freely-selected ECU in the network is used as an ECU for counter initialization (hereinafter also referred to as a master node), for the initialization processing of the counters. The master node executes processing of notifying all the ECUs of initial values of the counter values of all the CAN IDs (meaning the CAN IDs corresponding to the messages that require the message authentication; the same shall apply hereafter) at the time when the system is started.

Figure 9:
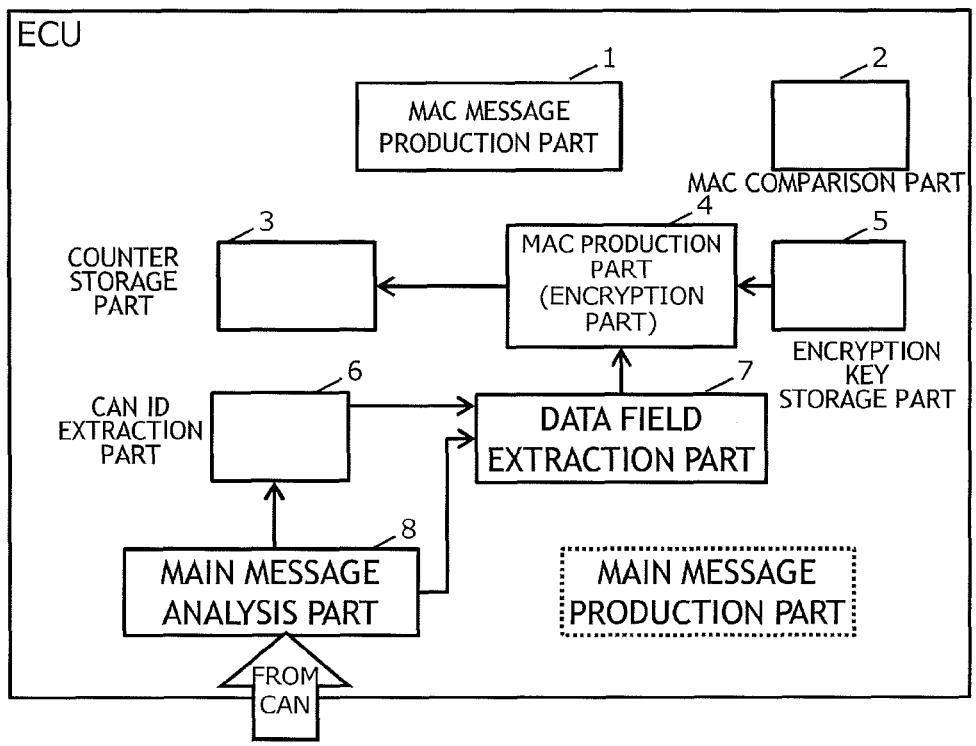
FIG. 9 is a view illustrating cooperation between respective function parts in an ECU receiving a counter initialization message.
Figure 10A:
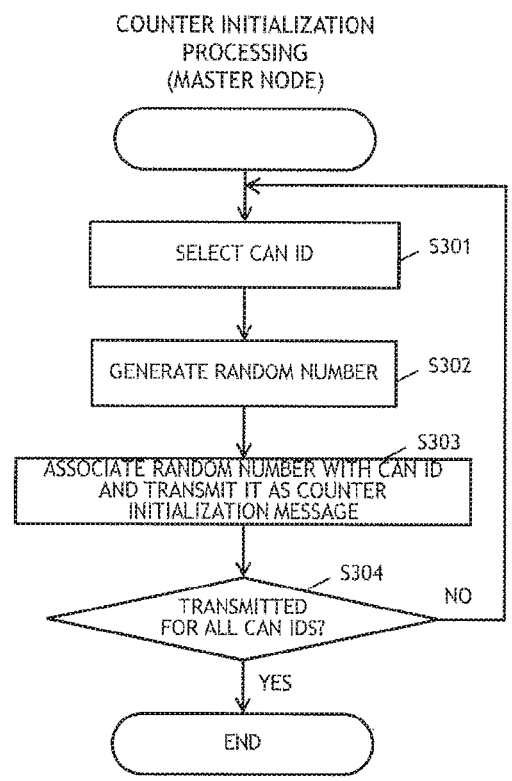
FIG. 10($a$) is a flowchart illustrating a flow of the processing at the time when a master node transmits the counter initialization message, and FIG. 10($b$) is a flowchart illustrating a flow of the processing at the time when a general node receives the counter initialization message.
Figure 10B:
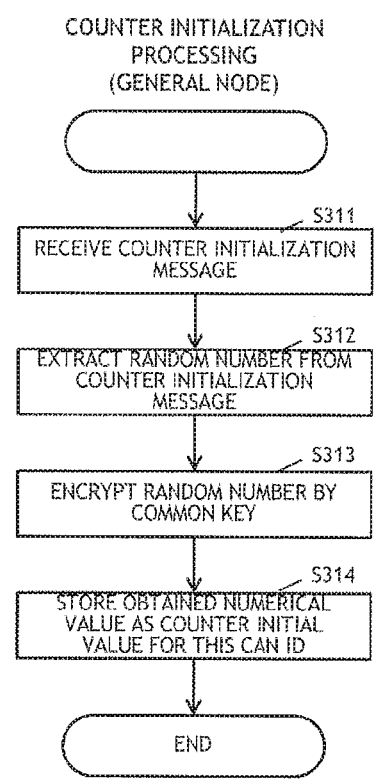
Figure 11:
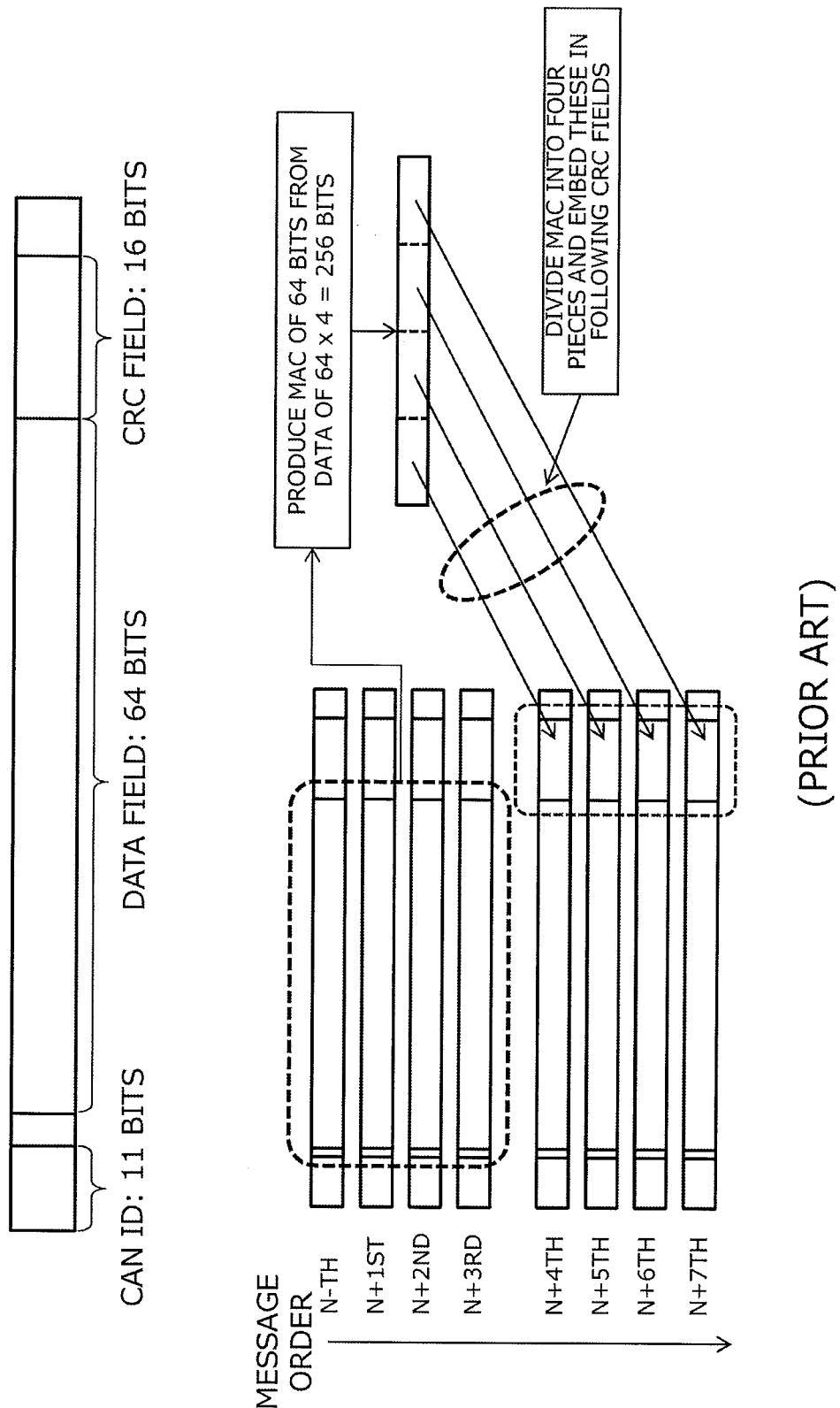
FIG. 11 is a view illustrating a message verification method in Non-Patent Document 1.

FIG. 9 is a view illustrating cooperation between the respective function parts in a general node, at the time when a counter value initialization message is received from the master node. FIG. 10(a) is a flowchart illustrating a flow of the processing at the time when the master node transmits the counter value initialization message. FIG. 10(b) is a flowchart illustrating a flow of the processing at the time when the general node receives the initialization message.

First, the processing executed by the master node will be explained with reference to FIG. 10(a). When the system starts, the master node selects the CAN ID (S301), and generates a random number for determining a counter initial value of the CAN ID (S302). Then, the master node associates the random number with the CAN ID whose counter is to be initialized, and transmits it as a counter initialization message (S303). The master node transmits the counter initialization message like this for each of all the CAN IDs.

Next, the processing executed by the general node will be explained with reference to FIG. 9 and FIG. 10(b). When receiving the counter initialization message (S311), the general node executes the following processing when the counter initialization message is for the CAN ID to be transmitted and received by the node (that is, when the counter value needs to be stored).

The data field extraction part 7 acquires the random number value that is produced by the master node, from the data field of the counter initialization message (S312). Then, the random number value is sent to the MAC production part 4. By using the encryption algorithm in the MAC production part 4, the received random number value is encrypted by using the encryption key (common key) in the encryption key storage part 5 (S313). Then, the obtained numerical value is stored in the counter storage part 3 as the counter initial value for this CAN ID (S314). It should be noted that, as the bit number of the output of the encryption processing (128 bits) and the bit number of the counter (53 bits) do not match each other, the counter initial value is decided according to the common rule in the system by employing, for example, 53 bits in the first half or 53 bits in the latter half.

Thereby, the counter values can be made identical in all the ECUs at the time of starting the system, without providing the nonvolatile memory for storing the counters, nor allowing the counter values themselves to be transported on the network in plaintext.

(Operation and Effects of this Embodiment)

According to this embodiment, the verification of the main message is made by using the message authentication code (MAC), which makes it possible to determine whether it is the valid main message or the invalid main message that is transmitted from the malicious device. As the counter value used for calculating the MAC changes every time the message is transmitted, it is possible for the ECU on the reception side to detect a malicious attack due to the difference in the MACs, at the time when the previously-received message is resent, that is, a replay attack is made.

Further, the message verification processing by the MAC, according to this embodiment, is designed according to the standardized CAN protocol, which makes it possible to reduce the influence on the existing system. For example, the existing CAN controller for processing the CAN message, which is made into hardware for the purpose of high speed processing and cost reduction, can be used for implementation according to this embodiment.

Furthermore, according to this embodiment, the data field and the CAN ID in the main message and the counter value are used for calculating the MAC. Here, the data field and the CAN ID flow on the network in plaintext, but the counter value itself does not flow on the network. When all the texts before and after the encryption are made clear, it is possible to decipher the encryption key by receiving a large number of messages. According to this embodiment, however, the counter value is not made clear to the malicious device, and hence the encryption key cannot be deciphered.

After transmitting the main message, the corresponding MAC message can be transmitted immediately. Therefore, it is possible for the reception ECU side to determine the validity of the main message instantly.

(Modification Example)

It is clear that the present invention is not limited to the above-described embodiment and various changes can be made. For example, the encryption algorithm and the key length to be employed may be freely selected, and the bit length of the counter value and the like may be changed freely in consideration of demands for safety and costs. Although the embodiment in which the present invention is applied to the CAN has been explained thus far, the present invention may be applied to any communication system conforming to the protocol that may not be the CAN but similar to the CAN.

Further, according to the above-described embodiment, the MAC is produced from the CAN ID and the data field contained in the main message and the counter value corresponding to the CAN ID, but the MAC may be produced from the data field of the main message and the counter value only. Thereby, it is also possible to determine whether the main message is transmitted by the replay attack or the like, or it is valid.

Furthermore, according to the above-described explanation, the counter value is incremented at the time of receiving and transmitting the main message, and the MAC is calculated by using the counter value after the increment. However, the MAC may be calculated by using the counter value before the increment. Further, according to the above explanation, the counter value is incremented by one, but the increment by one is not necessary required as long as the common rule is employed in all the ECUs, and the counter may be incremented by another value.

Furthermore, according to the above-described embodiment, the main message is processed after the validity of the main message is verified by the MAC. With regard to the messages that should be processed in a real-time manner, however, the validity may be verified after the main message is processed. In this case, when it is determined that the message is invalid, the message having the corresponding CAN ID may be ignored after that.

REFERENCE SIGNS LIST

1 MAC message production part
2 MAC comparison part
3 Counter storage part
4 MAC production part
5 Encryption key storage part
6 CAN ID extraction part
7 Data field extraction part
8 CAN message analysis part
9 CAN message production part

The invention claimed is:

1. A message authentication method in a communication system, in which a plurality of ECUs are connected via a controller area network (CAN), the message authentication method comprising:
a step of incrementing, by each of the plurality of ECUs other than a transmission ECU, a counter value that is stored in each of the plurality of ECUs other than the transmission ECU, when each of the plurality of ECUs other than the transmission ECU detects a main message having a message ID being transported on the CAN that the each of the ECUs may transmit or receive;
a step of transmitting, by the transmission ECU, the main message;
a step of incrementing, by the transmission ECU, the counter value when transmitting the main message;

a step of transmitting, by the transmission ECU, an MAC message containing a message authentication code that is produced based on the main message and the counter value;

a step of receiving, by a reception ECU, the main message;

a step of receiving, by the reception ECU, the MAC message; and a step of verifying, by the reception ECU, validity of the main message according to whether or not the message authentication code that is produced based on the main message and the counter value matches the message authentication code contained in the MAC message.

2. The message authentication method according to claim 1, wherein the message authentication code is produced by an encryption algorithm using a common key.

3. A message authentication method in a communication system, in which a plurality of nodes are connected via a controller area network (CAN), the message authentication method comprising:

a step of incrementing, by each of the plurality of ECUs other than a transmission ECU, a counter value that is stored in each of the plurality of ECUs other than the transmission ECU and that corresponds to a predetermined message ID, when the plurality of ECUs other than the transmission ECU detects a message having the predetermined message ID being transported on the CAN, the predetermined message ID being a message ID which the each of the plurality of ECUs may transmit or receive;

a step of transmitting, by the transmission ECU, a main message containing a message ID and a data field;

a step of incrementing, by the transmission ECU, the counter value corresponding to the message ID when transmitting the main message;

a step of transmitting, by the transmission ECU, an MAC message containing a message authentication code that is produced based on the message ID, the data field, and the counter value corresponding to the message ID;

a step of receiving, by a reception ECU, the main message;

a step of receiving, by the reception ECU, a MAC message; and a step of verifying, by the reception ECU, validity of the main message according to whether or not the message authentication code that is produced based on the message ID and the data field contained in the main message and the counter value corresponding to the message ID matches the message authentication code contained in the MAC message.

4. The message authentication method according to claim 3, wherein the message authentication code is produced by an encryption algorithm using a common key.

5. The message authentication method according to claim 4, wherein the message authentication code is produced by extracting predetermined bits from a bit string that is produced by applying the encryption algorithm using the common key to the message ID, the data field, and the counter value corresponding to the message ID.

6. The message authentication method according to claim 3, wherein a master ECU gives notification by broadcasting about an initial value of the counter value corresponding to each message ID, when the communication system is started.

7. The message authentication method according to claim 6, wherein the master ECU produces a random number value for each message ID and transmits the random number value by broadcasting, and each ECU uses a numerical value, produced by applying the encryption algorithm using the common key to the received random number value, as the initial value of the counter value corresponding to each message ID.

8. A communication system, in which at least a transmission ECU and a reception ECU are connected via a controller area network (CAN), wherein the transmission ECU includes:

counter value storing means for storing a counter value;

counter value incrementing means for incrementing the counter value when it is detected that a main message is being transported on the CAN, and when the transmission ECU transmits the main message;

main message transmitting means for transmitting the main message; and

MAC message transmitting means for transmitting an MAC message containing a message authentication code that is produced based on the main message and the counter value, and the reception ECU includes:

counter value storing means for storing the counter value;

counter value incrementing means for incrementing the counter value when it is detected that the main message having a message ID which the reception ECU may transmit or receive is being transported on the CAN;

receiving means for receiving the main message and the MAC message transmitted from the transmission ECU; and message verifying means for verifying validity of the main message according to whether or not the message authentication code that is produced based on the main message and the counter value matches the message authentication code contained in the MAC message.

9. The communication system according to claim 8, wherein the MAC message transmitting means in the transmission ECU and the message verifying means in the reception ECU produce the message authentication code by an encryption algorithm using a common key.

10. A communication system, in which at least a transmission ECU and a reception ECU are connected via a controller area network (CAN), wherein the transmission ECU includes:

counter value storing means for storing a counter value corresponding to a message ID;

counter value incrementing means for incrementing the counter value corresponding to a predetermined message ID when it is detected that a main message having the predetermined message ID is being transported on the CAN, and when the transmission ECU transmits the main message having the predetermined message ID;

main message transmitting means for transmitting the main message containing a message ID and a data field; and MAC message transmitting means for transmitting an MAC message containing a message authentication code that is produced based on the message ID, the data field, and the counter value corresponding to the message ID, and the reception ECU includes:
- counter value storing means for storing the counter value corresponding to the message ID;
- counter value incrementing means for incrementing the counter value corresponding to the predetermined message ID when it is detected that the main message having the predetermined message ID is being transported on the CAN, the predetermined message ID being a message ID which the each of the ECUs may transmit or receive;
- receiving means for receiving the main message and the MAC message transmitted from the transmission ECU; and
- message verifying means for verifying validity of the main message according to whether or not the message authentication code that is produced based on the message ID and the data field contained in the main message and the counter value corresponding to the message ID matches the message authentication code contained in the MAC message.

11. The communication system according to claim 10, wherein
the MAC message transmitting means in the transmission ECU and the message verifying means in the reception ECU produce the message authentication code by an encryption algorithm using a common key.

12. The communication system according to claim 11, wherein
the MAC message transmitting means in the transmission ECU and the message verifying means in the reception ECU produce the message authentication code by extracting predetermined bits from a bit string that is produced by applying the encryption algorithm using the common key to the message ID, the data field, and the counter value corresponding to the message ID.

13. The communication system according to claim 10, further comprising a master ECU that gives notification by broadcasting about an initial value of the counter value corresponding to each message ID, when the communication system is started.

14. The communication system according to claim 13, wherein
the master ECU produces a random number value for each message ID and transmits the random number value by broadcasting, and
the transmission ECU and the reception ECU use a numerical value, produced by applying the encryption algorithm using the common key to the received random number value, as the initial value of the counter value corresponding to each message ID.

* * * * *